Feb. 13, 1968   A. J. TULLENERS   3,368,875
APPARATUS FOR THE TREATMENT OF MINERAL OILS
Filed Feb. 1, 1965   2 Sheets-Sheet 1

INVENTOR
ANTHONY J. TULLENERS
BY C. Harvey Gold
ATTORNEY

Feb. 13, 1968 A. J. TULLENERS 3,368,875
APPARATUS FOR THE TREATMENT OF MINERAL OILS
Filed Feb. 1, 1965 2 Sheets-Sheet 2

INVENTOR
ANTHONY J. TULLENERS
BY C. Harvey Gold
ATTORNEY

United States Patent Office 3,368,875
Patented Feb. 13, 1968

3,368,875
APPARATUS FOR THE TREATMENT OF MINERAL OILS
Anthony J. Tulleners, Fullerton, Calif., assignor to Union Oil Company of California, Los Angeles, Calif., a corporation of California
Filed Feb. 1, 1965, Ser. No. 429,512
5 Claims. (Cl. 23—288)

ABSTRACT OF THE DISCLOSURE

Mineral oils are hydrogenated (e.g. hydrofined and/or hydrocracked) in the liquid phase by passing the oil horizontally through a plurality of juxtaposed hydrogenation zones, while effecting a generally countercurrent, horizontal flow of powdered, suspended hydrogenation catalyst serially through said hydrogenation zones. Apparatus is also described, including means for transporting the catalyst serially through said zones, and for transferring catalyst-free oil from one zone to the next.

*Background and summary of invention*

This invention relates to an apparatus and method for treating mineral oils, and in particular relates to an apparatus and method for treating heavy mineral oils in the presence of finely divided particulate catalysts. Specific treatments contemplated include hydrofining, hydrogenating, and hydrocracking.

In conventional systems used to hydrotreat heavy mineral oils containing an appreciable volume which is non-vaporizable under the processing conditions, the feedstock is generally passed downwardly in mixed vapor-liquid phase over hydrotreating macropellet catalyst in one or more reactors. In systems of this type, liquid by-passing and consequent inefficient catalyst utilization is quite common. Such liquid by-passing is particularly disadvantageous when attempting to eliminate a contaminant such as sulfur from the feedstock by hydrofining. When attempting to obtain molecular weight reduction or cracking of the feedstock, it is difficult to keep the liquid oil phase in contact with the catalyst for the optimum time without overexposing the liquid phase and, in certain instances, underexposing the light vapor phase. In such processes, satisfactory exposure of the vapor and liquid components of a mixed phase feed to the hydrotreating catalyst is very nearly impossible to obtain.

U.S. Patent 3,144,404, describes a recently developed process and apparatus for improving feed-catalyst contact while hydrotreating an oil containing an appreciable portion which is non-vaporizable under the processing conditions. The patented method comprises passing a liquid feedstock into a horizontally elongated reaction zone containing a macropellet hydrotreating catalyst bed while introducing hydrogen into the lower portion of said bed. The feedstock flows in liquid phase in a generally horizontal direction through the bed and is recovered at the opposite end thereof while the vaporous products produced by the reaction and excess hydrogen are recovered overhead in a vapor passageway provided above the catalyst bed. In this method over-exposure of the light vaporous materials is substantially eliminated.

Difficulties are encountered in the aforedescribed patented process when heavy mineral oils are hydrotreated for extended periods of time. In such cases, the interior surface areas of the macropellet catalyst in the elongated catalyst bed become relatively useless due to slow diffusion rates through the liquid barrier in and surrounding the catalyst pellets. As a result only a portion of the active catalyst surface area is effectively utilized. Moreover, the rate of catalyst deactivation is very rapid due to the absorption of coke-forming materials on interior catalyst surfaces where the supply of hydrogen is deficient due to the low diffusion rates of hydrogen through the liquid barrier. Because of this rapid deactivation and limited effective surface area of the catalyst, thermocracking reactions become relatively more prominent, with resultant production of a relatively unsaturated and unstable product. When this occurs, the reaction must be discontinued while the catalyst in the reaction bed is regenerated.

I have found that the aforementioned difficulties can be overcome by contacting a countercurrent flow relationship and hydrotreating zone, liquid phase feed oil and finely divided particulate catalyst. By operating in this manner, feed oil moving through said zone progressively contacts more active hydrotreating catalyst. Moreover, thermocracking is minimized because of the extended operative exterior surface area of the finely divided particulate catalyst.

In view of the foregoing, it is an overall objective of this invention to provide an apparatus and method for improving the efficiency of catalyst utilization, and to decrease the rate of catalyst deactivation, in liquid-vapor phase hydrotreating processes. A more specific object is to provide a novel method and apparatus for contacting liquid phase feed oil in a countercurrent flow relationship with finely divided particulate catalyst. Other objects will be more apparent from the detailed description which follows.

The invention can perhaps be best understood with reference to the attached drawings.

Figure 1:
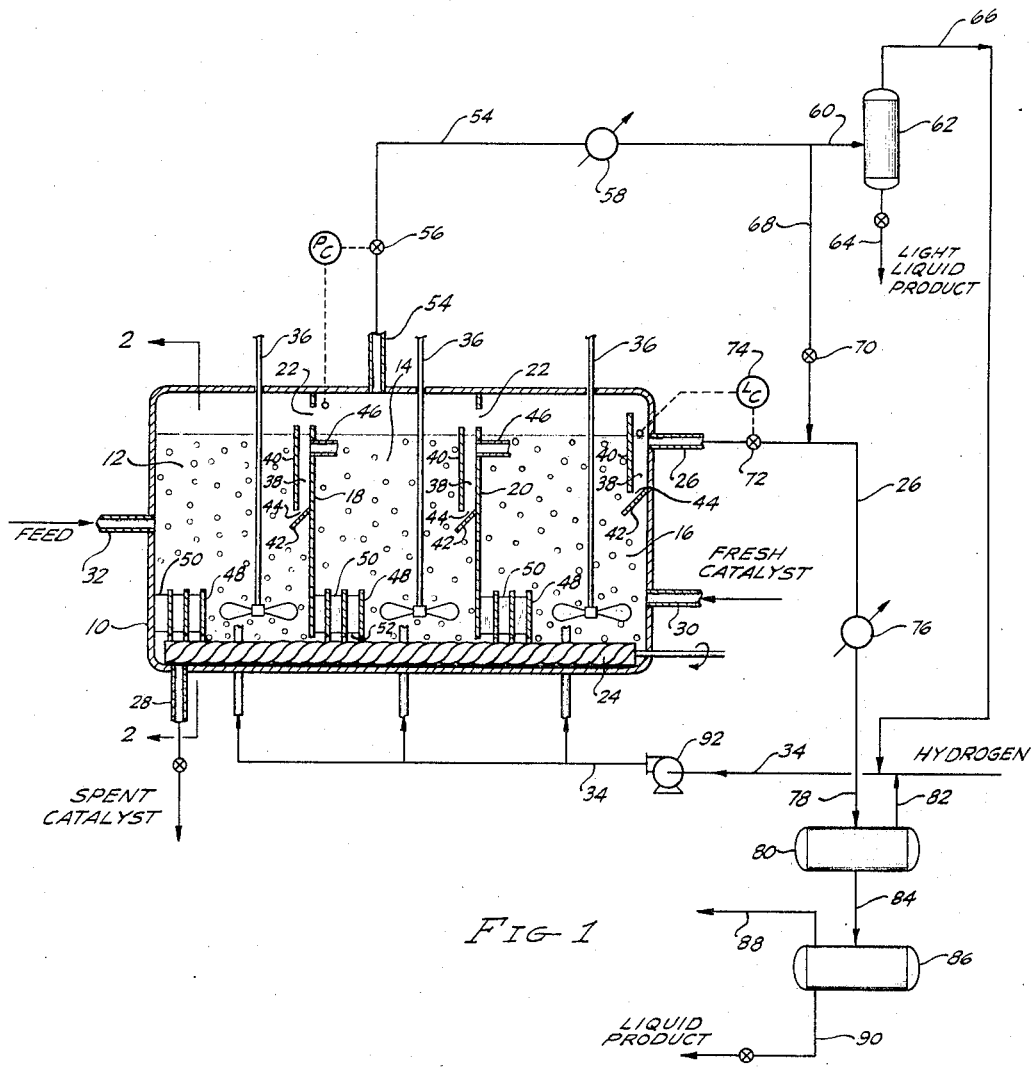
FIGURE 1 shows in cross-section a suitable embodiment of the hydrotreating apparatus for use herein, and also schematically illustrates suitable associated product recovery means, hydrogen recycle means, and feed supply means.

Referring now more particularly to FIGURE 1, an elongated pressure-retaining reaction vessel 10, suitably constructed of iron, steel, or other metal according to conventional design, is divided into a plurality of reaction zones 12, 14 and 16 by partitions 18 and 20. A passageway 22 for gaseous materials is provided at the top of each of partitions 18 and 20. While the reaction vessel 10 illustrated in FIGURE 1 shows only three reaction zones, the vessel can be constructed to contain any number of such zones. Catalyst conveyor means such as a helical screw conveyor 24 is positioned at the bottom of reaction vessel 10 and extends throughout its entire length. Each reaction zone is provided with separation means, as will be subsequently described, for separating liquid feed oil from finely divided catalyst and for transferring said separated feed oil to an adjacent reaction zone. The separation means in reaction zone 16 is associated with conduit 26 for removing treated product from reaction vessel 10. Each reaction zone is also provided with catalyst accumulation means, hereafter described, for directing particulate catalyst into contact with screw conveyor 24 whereupon it is transported to an adjacent reaction zone and ultimately out of reaction vessel 10 through catalyst outlet 28.

A suitable mode of operation of the apparatus of FIG-

URE 1 is as follows: Finely divided powdered catalyst is introduced into reactor vessel 10 via conduit 30 and is distributed throughout the entire length of the vessel by screw conveyor 24. The amount of catalyst to be employed can vary widely, depending upon the type of operation to be preformed. It is contemplated that from about 1 to 60 percent and ordinarily 5 to 40 percent of the total volume of the contacting zone in each reaction zone will be occupied by catalyst at its static gross bulk. The more catalyst employed, the greater will be the permissible feed oil throughput rate. Preferably the catalyst bed in the reaction zones has an overall length over three times its height and most preferably, over five times its height.

With a catalyst charge in place, preheated feed oil, at least partially in a liquid phase, is introduced into reaction vessel 10 via conduit 32 and hydrogen is introduced into the bottom of each of said reaction zones through hydrogen supply line 34. Liquid feed oil introduced into reaction vessel 10 moves through the entire length of said vessel, progressively forming a substantially uniformly dispersed embullient slurry with particulate catalyst in reaction zones 12, 14 and 16 as it is mixed with stirrer 36. The liquid is separated from the finely divided particulate catalyst in each reaction zone by separation means of the type shown in FIGURE 1 which comprises a settling zone 38, formed by means of a flat vertical baffle 40 having a straight bottom edge, and being affixed, as by continuous weldment, to opposite walls of reaction vessel 10. The lower extremity of settling zone 38 is defined by a sloping, flat solids-return baffle 42 welded to partition 18 and the opposite walls of reaction vessel 10. The lower edge of baffle 40 terminates a sufficient distance above the upper surface of baffle 42 to provide a straight horizontal aperture 44 of desired width, e.g., 0.001 to 0.25 inch. Liquid product is transferred from settling zone 38 to an adjacent reaction zone by means of outlet conduit 46 communicating therewith.

Settling zone 38 provides a substantially quiescent zone which allows the solid particulate catalyst to settle by gravity and be returned to the reaction zone via aperture 44. To maintain settling zone 38 in a substantially quiescent state, the hydrogen throughput rate in the reaction zones is controlled so that substantially no gas bubbles enter said settling zone 38. To minimize catalyst back-flow in conduit 46 and resulting mingling of feed oil with catalyst, conduit 46 may be filled with packed materials such as alundum balls, glass beads, marble chips or similar packing materials to provide tortuous passageways with small cross-sectional areas so as to more effectively prevent flow of slurry catalyst into said conduit 46.

Figure 2:
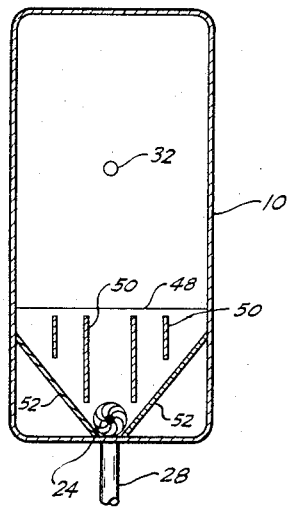
FIGURE 2 is a sectional view of FIGURE 1 along line 2—2.

Powdered catalyst introduced into reaction vessel 10 via catalyst input line 30 also traverses the length of reaction vessel 10 during the process of my invention, but in a direction countercurrent to the flow of feed oil therethrough. In this manner, liquid feed oil being hydrotreated progressively contacts more active catalyst. Particulate catalyst is transferred to adjacent reaction zones by means of screw conveyor 24 and catalyst accumulation means, shown in detail in FIGURE 2. The catalyst accumulation means comprise a series of vertical baffles 48 affixed to opposite walls of reaction vessel 10 and a series of vertical baffles 50 which traverse baffles 48 and lie in a direction essentially parallel to the elongated axis of said reaction vessel 10. The bottom of the accumulation means is defined by a flat solids-return plate 52 which slopes in a downward direction from the side walls of reaction vessel 10 towards screw conveyor 24. The lower edges of baffles 50 terminate a sufficient distance above the upper surface of plate 52 to provide horizontal apertures which allow solid catalyst to slide along the upper surface of plate 52 into contact with screw conveyor 24 and form a compact mass thereabout, thereby preventing flow of liquid between adjacent reaction zones through the passageway provided between said reaction zones for screw conveyor 24. Solid particulate catalyst is transferred by screw conveyor 24 from the accumulation means to an adjacent reaction zone, where it is again mixed with liquid material in said reaction zones to form a slurry. Screw conveyor 24 is rotated by conventional means not shown in the drawing.

Referring again to FIGURE 1, vaporized feed components plus hydrogen are continuously withdrawn from reaction vessel 10 via vapor outlet conduit 54, controlled by backpressure-regulated valve 56. The gaseous effluent in line 54 is cooled in condenser 58, and may then be transferred either via line 60 to gas-liquid separator 62 for separate recovery of light liquid product via line 64 and hydrogen, which is recycled via line 66, as will be subsequently described, or it may be diverted via line 68 and valve 70 to the liquid product recovery system to be hereinafter described.

Liquid product from reaction zone 16 is withdrawn via outlet conduit 26 and valve 72 in response to liquid level controller 74 which maintains the feed oil in reactor vessel 10 at a predetermined level 75. The liquid in line 26 is passed through cooler 76, and is transferred via line 78 to high-pressure separator 80 from which hydrogen recycle gas is withdrawn via line 82. Liquid product in separator 80 is withdrawn via line 84, and is flashed into low-pressure separator 86, from which light hydrocarbon gases, $H_2S$, etc., are withdrawn overhead via line 88, and liquid product is withdrawn via valve line 90 and sent to product fractionation equipment not shown. Recycle hydrogen in line 66 is blended with fresh make-up hydrogen from line 34 and line 82, and the mixture is then returned to the reactor via compressor 92 and line 34.

Figure 3:
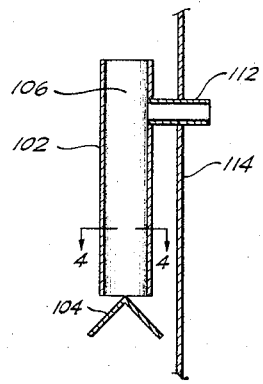
FIGURE 3 illustrates, in vertical cross-section, a modification of the catalyst settling means shown in FIGURE 1.
Figure 4:
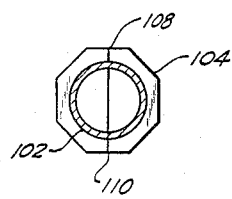
FIGURE 4 is a horizontal cross-section taken along line 4—4 of FIGURE 3.

FIGURES 3 and 4 illustrate a modification of the separation means shown in FIGURE 1. The principle apparatus of the modification comprises a cylindrical shell 102, which is open at its upper and lower ends. Immediately below cylindrical shell 102 is positioned a V-shaped baffle 104, the apex of which is welded across the lower edge of cylindrical shell 102. Baffle 104 functions merely as a bubble deflector to exclude bubbles from internal settling zone 106 of cylindrical shell 102. Bubbles rising in the reaction zone are mostly channeled by the concave under-surface of baffle 104 into two streams rising from the opposite extremities 108 and 110 of the apex of the baffle. These bubbles are discharged from beneath 104 at a level such that they cannot enter the open end of cylindrical shell 102. The remaining bubbles, which are not caught beneath baffle 104, are deflected around the periphery thereof, which is spaced considerably outwardly from the perimeter of the cylindrical shell 102, thus effectively excluding them also from settling zone 106. The total liquid product is transferred to an adjacent reaction zone via outlet conduit 112 which traverses partition 114.

Figure 5:
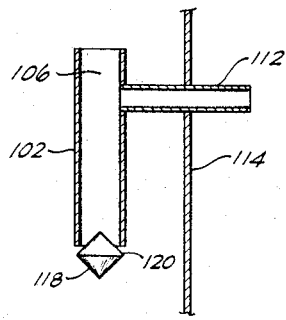
FIGURE 5 illustrates in vertical cross-section, a modification of the central portion of the apparatus of FIGURE 3, showing a different form of baffle.

Referring now to FIGURE 5, this apparatus is constructed similar to that of FIGURE 3. Again there is provided a cylindrical shell 102, which is open at its upper and lower ends. The bottom of cylindrical shell 102 is partially closed by a solid distributing cone 118, supported within said shell by brackets not shown, the base of which is somewhat larger in diameter than the diameter of said cylindrical shell 102. Cone 118 is inserted just far enough into cylindrical shell 102 to provide an annular slurry withdrawal aperture 120 of the desired width.

The foregoing description of apparatus for use herein is not intended to be exhaustive; obviously many variations of such apparatus may be constructed which will achieve the same essential ends.

While the apparatus described above may be used to carry out a great variety of chemical and/or physical treatments of liquid feedstock, it is designed primarily to effect reactions commonly referred to as hydrofining and/or hydrocracking. Suitable feedstocks for such operations comprise gas oils, kerosene, jet fuels, fuel oils, cycle oils from other cracking operations, crude oils, crude oil residua, etc. It is preferred to employ feedstocks containing a substantial proportion of materials boiling above 500° F., and even above 700° F.

The hydrogenating catalyst used in the aforementioned treatments is in the form of finely subdivided particles having diameters less than about 40 microns and preferably between about 0.01 and 10 microns. The catalyst generally comprises transitional metals, and specifically titanium, vanadium, chromium, manganese, iron, cobalt, nickel, copper, zinc, zirconium, molybdenum, ruthenium, rhodium, palladium, cadmium, tantalum, tungsten, iridium, platinum, etc. These metals may be employed in free form, or in the form of oxides, sulfides, sulfates, or other compounds. It is found in most cases that the sulfide form of the metal is preferred. The metals or their compounds may be employed singly or in admixture with one or more other metal components. A preferred class of metals comprises the Group VI–B and Group VIII members, particularly combinations of one or more Group VI–B metals with one or more Group VIII metals.

The active hydrogenating component may be employed in substantially undiluted form, but may also be distended upon an adsorbent carrier in proportions ranging between about 0.5 and 50 percent by weight. Suitable carriers include in general the difficulty reducible adsorbent inorganic oxides, for example silica gel, alumina gel, mixtures of silica and alumina, zirconia, titania, magnesia, beryllia, etc. Various natural clays may also be employed after suitable activation by heat and/or acid treatment. Such clays include for example the various montmorillonite clays, e.g., bentonite.

The operation generally referred to as hydrofining is carried out to effect desulfurization, denitrogenation, deoxygenation, color improvement, or merely to effect hydrogenation of gum-forming olefins. Hydrofining is generally carried out at temperatures between about 500° F. and 850° F., and pressures between about 50 and 5,000 p.s.i.g. Liquid hourly space velocities (based upon the actual volume of catalyst used at its static bulk density) may vary between about 0.2 and 50 volumes of liquid feed per volume of catalyst per hour. Preferred catalyst for hydrofining include particularly the combination of Group VI–B metal oxides or sulfides with Group VIII metal oxides or sulfides. Particularly desirable catalysts comprise cobalt sulfide plus molybdenum sulfide, or tungsten sulfide plus nickel sulfide, supported upon alumina or silica-stabilized alumina.

Hydrocracking operations may be carried out within the same general range of temperature and pressure conditions as prescribed for hydrofining although pressures above about 500 p.s.i.g. are generally preferred. Similar space velocities may also be utilized. Higher temperatures and pressures generally tend to favor hydrocracking, but usually it is preferred to obtain hydrocracking by altering the catalysts so as to provide an acidic cracking component therein. Wherein acidic catalyst is employed, temperatures as low as about 400° F. may sometimes be used. Hydrocracking catalysts generally comprise a hydrogenating metal, oxide or sulfide (preferably a sulfide) as described above in connection with hydrofining, but the hydrogenating component is generally supported upon a more or less acidic cracking base. Suitable cracking bases include, for example, composites of silica-alumina, silica-magnesia, silica-zirconia, silica-zirconia-titania, and the like. These cracking bases are preferably impregnated with between about 1 percent and 30 percent by weight of hydrogenating component. The metals nickel, cobalt, platinum, rhodium and palladium or the sulfides thereof are preferred hydrogenating components for hydrocracking catalysts. Certain zeolitic molecular sieves may also be employed as hydrocracking catalyst bases.

The preferred cracking bases comprise composites of silica and alumina containing about 50 percent to 90 percent silica; coprecipitated composites of silica, titania and zirconia containing between 5 percent and 75 percent of each component; decationized, zeolitic, crystalline molecular sieves of the Y crystal type, having relatively uniform pore diameters of about 9 to 10 A., and consisting substantially entirely of silica and alumina in mole-ratios between about 4:1 and 6:1. Any of these cracking bases may be further promoted by the addition of small amounts, e.g., 1–10 percent by weight, of halides such as fluorine, boron trifluoride, silicon tetrafluoride, etc.

In the liquid-phase treatments of this invention, hydrogen rates are determined from a chemical standpoint merely by the amount required to maintain pressure, and thus to maintain in the liquid phase substantially saturated with hydrogen at reactor pressure. These chemical requirements generally lie within the range of about 200 to 2,000 s.c.f. per barrel of liquid feed. However, in addition to the chemical requirements, a sufficient excess amount can be supplied to obtain the desired mechanical agitation to keep the catalyst suitably dispersed.

Having described this invention, what is sought to be protected by Letters Patent is set forth in the following claims.

I claim:

1. Apparatus for hydrotreating and hydrogenating mineral oil comprising:
    (a) a horizontally elongated vessel subdivided into a plurality of reaction zones by partitions spaced along the horizontal axis of said vessel;
    (b) means positioned at the top of said vessel for removing gaseous materials from said reaction zones and said vessel;
    (c) conduit means for introducing finely divided particulate catalyst into a catalyst inlet end of said vessel and conduit means for injecting liquid feedstock into the opposite, feed-inlet end of said vessel;
    (d) agitating means in each of said reaction zones for maintaining a substantial portion of the catalyst suspended in the oil therein;
    (e) catalyst conveying means positioned in the bottom of said vessel for moving settled particulate catalyst from said catalyst-inlet end of said vessel to said feed-inlet end; and
    (f) separation means positioned in each of said reaction zones for separating particulate catalyst from liquid and transferring said separated liquid out of said reaction zone to the adjacent reaction zone in a direction towards said catalyst-inlet end of said vessel, said separation means in the reaction zone adjacent to said catalyst-inlet end of said vessel being in communication with liquid product removal means for removing hydrotreated catalyst-free liquid product from said vessel.

2. Apparatus as defined in claim 1 wherein each of said separation means comprises:
    (a) a settling tube having an open top end positioned adjacent the top of said reaction vessel and an open bottom end positioned adjacent the bottom of said reaction vessel;
    (b) a baffle member supported within said settling tube which completely covers in a horizontal projection the bottom end of said tube, at least a peripheral portion of said baffle member being spaced between 1/1000 inch to 1/4 inch below the lower end of said settling tube to provide a narrow, elongated aperture communicating between the interior of said settling tube and the reaction zone; and
    (c) a fluid outlet conduit opening from the upper portion of said settling tube and traversing the partition between adjacent reaction zones to provide a passageway for fluid flow between said adjacent reaction zones.

3. Apparatus as defined in claim 2 wherein said baffle member is in the form of a cone of larger base diameter than said settling tube and is supported uprightly and concentrically in said settling tube with its apex extending a sufficient distance into the lower end of said settling tube to define said aperture between the lower end of said settling tube and the sloping walls of said cone.

4. Apparatus as defined in claim 1 wherein the means for removing gaseous materials from the reaction zones and the reaction vessel comprises a passageway for gaseous materials provided in said partitions at a point substantially adjacent to the top of the reaction vessel and a conduit positioned at the top of said vessel for removing gaseous materials therefrom.

5. Apparatus of the type defined in claim 1 wherein said catalyst conveyor means for moving particulate catalyst from said catalyst-inlet end from said vessel to said feed-inlet end comprises a helical screw in combination with catalyst directing means positioned in each of said reaction zones for separating particulate catalyst from liquid feedstock and directing said particulate catalyst into contact with said screw conveyor.

References Cited

UNITED STATES PATENTS

| | | | |
|---|---|---|---|
| 2,517,339 | 8/1950 | Offutt et al. | 208—176 |
| 2,686,710 | 8/1954 | Jewell | 208—163 |
| 2,895,906 | 7/1959 | Harper | 208—164 |
| 2,899,380 | 8/1959 | Lanning | 208—108 |
| 3,144,404 | 8/1964 | Tyson | 208—264 |

ABRAHAM RIMENS, *Primary Examiner.*